United States Patent [19]
Barr, Jr.

[11] 3,736,556
[45] May 29, 1973

[54] METHOD AND APPARATUS FOR INCREASING SEISMIC SIGNAL-TO-NOISE RATIO

[75] Inventor: Frederick J. Barr, Jr., San Antonio, Tex.

[73] Assignee: Petty Geophysical Engineering Company, San Antonio, Tex.

[22] Filed: Sept. 8, 1971

[21] Appl. No.: 178,654

[52] U.S. Cl.......340/15.5 EC, 340/15.5 CP, 235/181
[51] Int. Cl. ..............................................G01v 1/24
[58] Field of Search................340/15.5 EC, 15.5 CP, 340/15.5 SW; 324/77 A, 77 R; 343/7.4; 235/181; 325/56, 65, 305, 367, 371

[56] References Cited

OTHER PUBLICATIONS

Seismic Signal Enhancement With Three Component Detectors, Shimshoni and Smith, Geophysics, Vol. XXIX, No. 5, pp. 664–671.

*Primary Examiner*—Benjamin A. Borchelt
*Assistant Examiner*—H. A. Birmiel
*Attorney*—Tom Arnold, Robert A. White and Bill Durkee et al.

[57] ABSTRACT

An improved technique for enhancing the signal-to-noise ratio in the automatic processing of seismic data is provided according to the present invention. Signals from horizontally and vertically oriented geophones, representing two functions of time, are separately recorded. The product of these two signals is formed as a signal representative of a third function of time. The product signal thus formed is then used in various ways as an "enhancement function" signal, to attenuate noise components and enhance seismic signal components. One technique for utilizing the enhancement function signal involves half-wave rectifying the enhancement function signal and then multiplying the rectified signal by the original signal from the vertically oriented geophone. Another technique involves using the enhancement function signal to produce a gating signal to cancel the original output signal from the vertically oriented geophone whenever the enhancement function signal is other than negative.

18 Claims, 5 Drawing Figures

PATENTED MAY 29 1973                                3,736,556

METHOD AND APPARATUS FOR INCREASING SEISMIC SIGNAL-TO-NOISE RATIO

FIELD OF THE INVENTION

The present invention relates generally to seismic surveying and more particularly to the automatic processing of information in the form of seismic signals. As used herein, the term "seismic signal" means a signal representative of a compressional wave.

BACKGROUND OF THE INVENTION

It has long been desired, in some seismological activities, to eliminate in whole or in part certain undesired signals generated in detection systems by the movement of the earth, while at the same time preserving, or preferably enhancing, other signals so generated. For example, as indicated in the patent to Owen, U.S. Pat. No. 2,215,297, issued Sept. 17, 1940, it is often desirable to eliminate the effects of ground-roll waves when investigating subsurface formations, since such waves interfere with the accurate detection and recording of waves travelling from points of interest below the surface. In the mentioned patent to Owen, the effects of ground-roll waves are eliminated by a relatively simple phase-shifting technique, utilizing LR filtration.

More recently, in a patent to J. E. White (U.S. Pat. No. 3,344,881, issued Oct. 3, 1967) and in an article by him published in *Geophysics*, vol. XXIX, no. 2, April 1964, it is indicated that the elimination of seismic noise remains an unachieved objective with modern seismometers. However, neither the patent nor the publication relates to the problems of seismic exploration, and neither suggests the signal-enhancement techniques of the present invention, which will be fully described below. The technique disclosed by White is similar to those of the present invention only in that both provide for the multiplication of a vertical signal component by a horizontal signal component.

In an article by M. Shimshoni and S. W. Smith, published in *Geophysics*, vol. XXIX, no. 5, October 1964, there is disclosed a seismic-signal enhancement technique stated to be useful in earthquake and explosion seismology. The technique therein disclosed involves multiplication of horizontal and vertical signal components, filtering the product thus obtained, and multiplying the horizontal or vertical signal by the filtered signal. As stated by the authors, the filtration step, while necessary to their technique, has the disadvantageous effect of introducing time uncertainties in the signal processing. The techniques of the present invention, among other differences as will be seen from the more complete discussion to follow, do not require filtration of the first multiplication product signal and hence avoids the disadvantageous effect thereof.

It is a feature of this invention to provide more accurate, and hence more useful, seismic information by the suppression of seismic noise signals.

It is a further feature of this invention to provide a method and apparatus for enhancing the signal-to-noise ratio in seismic detection systems.

It is yet another feature of this invention to provide a method and apparatus for enhancing seismic signal-to-noise ratios without introducing arrival-time uncertainties into the system.

Further features and advantages of the invention will be apparent to persons skilled in the art from consideration of this specification, including the claims and the drawings.

SUMMARY OF THE INVENTION

Generally, the present invention contemplates the use of a geophone oriented to receive principally energy from a horizontal direction and a geophone oriented to receive principally energy from a vertical direction, placed near each other on the surface of the earth. As used herein, the terms "horizontal geophone" and "vertical geophone" refer respectively to geophones so oriented. The geophones receive waves caused by an explosion or disturbance at another point, either on the surface of the earth, or above or below the surface. The output signals from the horizontal and vertical geophones are recorded as separate channels on an appropriate seismic-signal recording device, producing signals representative of two functions of time. These two signals are multiplied together, forming a signal representative of a third function of time, which signal is called the signal-enhancement-function signal. The signal-enhancement-function signal is then used, in any of a variety of ways, with the signal representative of a second function of time, to produce a signal representative of a fourth function of time. This signal is then filtered to attenuate undesired frequencies in which seismic signals have been enhanced and seismic noise has been attenuated.

DESCRIPTION OF THE PREFERRED EMBODIMENTS

Figure 1:
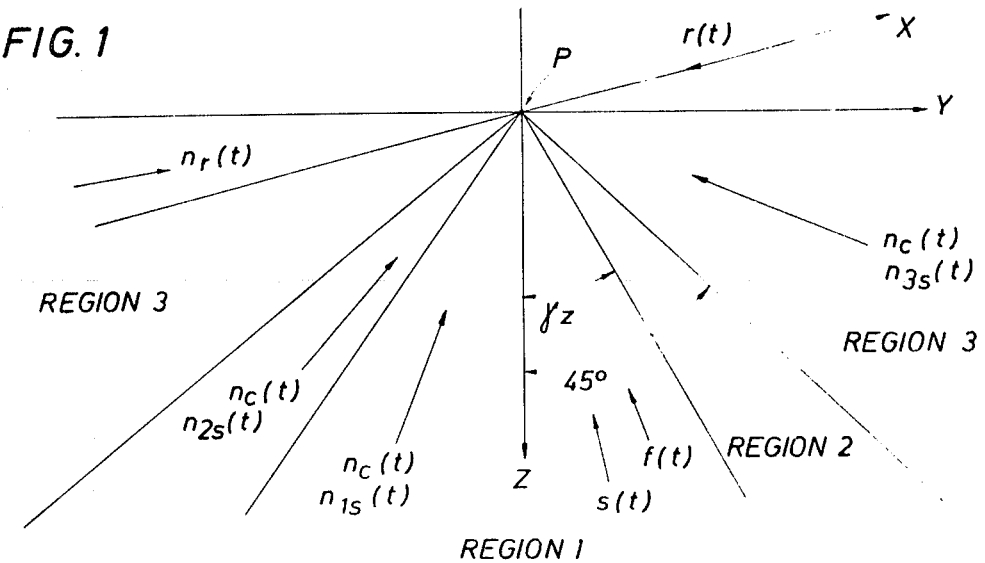
FIG. 1 of the drawings is a general representation of the subsurface regions of the earth which are of interest.

Referring now to the drawings, and more particularly to FIG. 1 thereof, a set of rectangular coordinate axes $x,y,z$, intersect at point P. The axes $x$ and $y$ define a horizontal plane to which the surface of the earth approximately conforms for short distances. Assuming that a shot point or other source of seismic energy is located somewhere along the $x$ axis, the following subsurface regions may be defined, as shown in FIG. 1:

Region 1 is the space within the cone surface described by an angle $\gamma_z = \sin^{-1}(\beta/\alpha)$ from the vertical or $z$ axis, where $\alpha$ is the velocity of propagation of compression waves in the earth, and $\beta$ is the velocity of propagation of shear waves in the earth.

Region 2 is the space between region 1 and the cone surface described by an angle of 45° from the vertical or $z$ axis.

Region 3 is the space outside regions 1 and 2 and below the surface of the earth.

Also pictured in FIG. 1 are various waves arriving at point P. These are:

$f(t)$ = the desired compression wave signals;
$s(t)$ = vertical shear wave from region 1;
$n_c(t)$ = compression wave noise;
$n_{1s}(t)$ = vertical shear wave noise from region 1;
$n_{2s}(t)$ = vertical shear wave noise from region 2;
$n_{3s}(t)$ = vertical shear wave noise from region 3;

$r(t)$ and $n_r(t)$ = Rayleigh wave noise arriving at point P.

Figure 3:
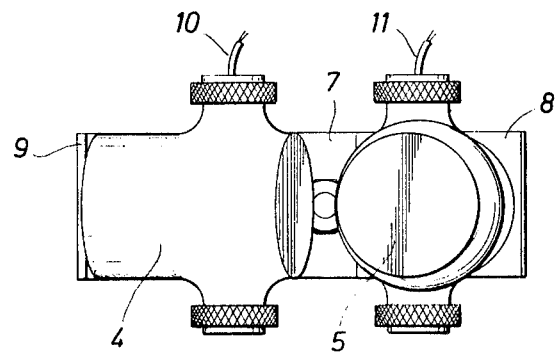
FIG. 3 is a plan view of said geophones.
Figure 2:
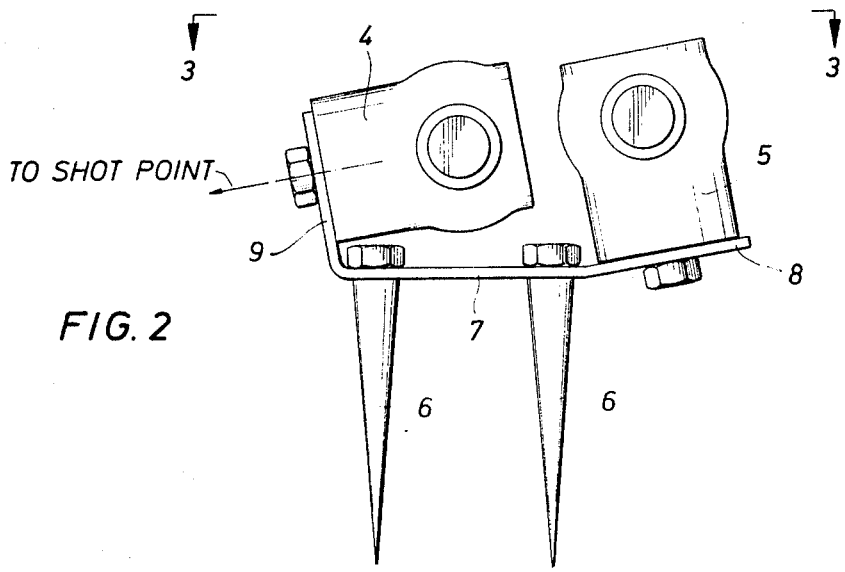
FIG. 2 is a side view of geophones and their mounting, which may be utilized in a preferred embodiment of the invention.

Referring now to FIGS. 2 and 3, a horizontal geophone 4 and a vertical geophone 5 are shown. It is not necessary that any special geophones be used, and almost any geophones now commercially available may be used. For example, matched horizontal and vertical units, model No. GSC–11D, available from Geo Space Corporation, Houston, Tex., may be employed. It is desirable that the geophones used be, as nearly as possible, a matched pair.

The geophones 4 and 5 are mounted on a platform comprising three sections 7, 8 and 9. Section 7, the center section, is horizontal and is designed for the ready fastening thereto of support spikes 6, in the conventional manner well known to persons skilled in the art. I have found that it is beneficial, in the practice of the present invention, to cant section 8 of the platform by a small angle to the horizontal plane, for example, 10°, and to cant section 9 by the same angle to the vertical plane, so that the sensitivity axes of geophones 4 and 5 are maintained perpendicular to each other. An imaginary extension of the sensitivity axis of geophone 4 should include a shot point from which seismic waves originate, as shown in FIG. 2.

As shown in FIG. 3, leads 10 and 11 extend from the horizontal and vertical geophones 4 and 5 respectively, to conduct the output signals thereof for processing in accordance with the invention.

The assembly of FIGS. 2 and 3 is placed on the surface of the earth. For practical application purposes, it may be assumed that the geophones 4 and 5 are located at a single point, such as point P in FIG. 1. Then, according to well-known principles of seismology, for example, as shown in J. E. White, "Motion Product Seismograms," *Geophysics*, Vol. 29, No. 2, pages 288–298, the vertical and horizontal geophone output signals resulting from the arrival of the previously mentioned waves at point P may be expressed as $$V_x(t) = A(\gamma z) \cos \theta_c(t) f(t) + F_1(\gamma z) \cos \theta_s(t) s(t)$$
$$+ H \cos \theta_r(t) \{r(t)\}_{\pi/2} + \int_{\theta=-\pi}^{\pi} \cos \theta(t) [A(\gamma z) n_c(\theta, t)$$
$$+ F_1(\gamma z) n_1 s(\theta, t) + F_2(\gamma z) n_{2s}(\theta, t) - F_2(\lambda z) n_3 s(\theta, t)$$
$$+ H\{n_r(\theta, t)\}_{\pi/2}] d\theta$$

and $$V_z(t) = B(\lambda z) f(t) - G_1(\lambda z) s(t) + r(t)$$
$$+ \int_{\theta=-\pi}^{\pi} [B(\lambda z) n_c(\theta, t) - G_1(\lambda z) n_{1s}(\theta, t)$$
$$- G_2(\gamma z) \{n_{2s}(\theta, t)\}_{\pi/2} - G_2(\gamma z) \{n_{3s}(\theta, t)\}_{\pi/2} + n_r(\theta, t)] d\theta$$

where $$A = \frac{4 \sin \gamma_z \cos \gamma_z (\beta/\alpha)[1-(\beta/\alpha)^2 \sin^2 \gamma_z]^{1/2}}{D}$$

$$B = \frac{2 \cos \gamma_z [1-2(\beta/\alpha)^2 \sin^2 \gamma_z]}{D}$$

$$D = [1-2(\beta/\alpha)^2 \sin^2 \gamma_z]^2 + 4(\beta/\alpha)^3 \sin^2 \gamma_z$$

$$F_1 = 2\cos\gamma_z(1-2\sin^2\gamma_z)/E$$

$$G_1 = \frac{4 \sin \gamma_z \cos \gamma_z [(\beta/\alpha)^2 - \sin^2 \gamma_z]^{1/2}}{E}$$

$$E = (1-2\sin^2\gamma_z)^2 + 4\sin^2\gamma_z \cos\gamma_z[(\beta/\alpha)^2 - \sin^2\gamma_z]^{1/2}$$

$$F_2 = 2\cos\gamma_z(1-2\sin^2\gamma_z)/E_1$$

$$G_2 = \frac{4 \sin \gamma_z \cos \gamma_z [\sin^2 \gamma_z - (\beta/\alpha)^2]}{E_1}$$

$$E_1 = [(1-2\sin^2\gamma_z)^4 + 16\sin^4\gamma_z \cos^2\gamma_z(\sin^2\gamma_z - (\beta/\alpha)^2)]^{1/2}$$

$$H = \frac{2-(C_r/\beta)^2 - 2[1-(C_r/\beta)^2]^{1/2}[1-(C_r/\alpha)^2]^{1/2}}{(C_r/\beta)^2[1-(C_r/\alpha)^2]^{1/2}}$$

$c_r$ = velocity of a Rayleigh wave across the surface of the earth, in ft./sec.

$\theta$ = angle of approach of respective waves, measured from the $x$ axis, in radians $\{f(t)\}_{\pi/2}$ = a function of time having all its frequency components shifted by 90° with respect to those of $f(t)$.

In the technique of the present invention, the outputs of the horizontal and vertical geophones, $V_x(t)$ and $V_z(t)$, are multiplied, producing a signal which may be represented as $$V_x(T)V_z(t) = A(\gamma z)B(\gamma z) \cos \theta_c(t) f^2(t)$$
$$- F_1(\gamma z)G_1(\gamma z) \cos \theta_s(t) s^2(t) + H \cos \theta_r(t) r(t) \{r(t)\}_{\pi/2}$$
$$+ \int_{\theta=-\pi}^{\pi} A(\gamma z)B(\gamma z) n_c^2(\theta, t) \cos \theta(t) d\theta$$
$$- \int_{\theta=-\pi}^{\pi} F_1(\gamma z)G_1(\gamma z) n_{1s}^2(\theta, t) \cos \theta(t) d\theta$$
$$- \int_{\theta=-\pi}^{\pi} F_2(\gamma z)G_2(\gamma z) n_{2s}(\theta, t) \{n_{2s}(\theta, t)\}_{\pi/2} \cos \theta(t) d\theta$$
$$+ \int_{\theta=-\pi}^{\pi} F_2(\gamma z)G_2(\gamma z) n_{3s}(\theta, t) \{n_{3s}(\theta, t)\}_{\pi/2} \cos \theta(t) d\theta$$
$$+ \int_{\theta=-\pi}^{\pi} H n_r(\theta, t) \{n_r(\theta, t)\}_{\pi/2} \cos \theta(t) d\theta$$

+ (uncorrelated crossproducts).

By formulating the product of $V_x(t)$ and $V_z(t)$ in this manner, I have discovered that the product signal representative of the function $V_x(t) V_z(t)$ will have appreciable positive values in the presence of the seismic signal $f(t)$ and compression noise $n_c(t)$. The truth of this may be mathematically verified by observing that:

1. The functions $A$, $B$, $F_1$, $G_1$, $F_2$, $G_2$, and $H$ are all positive real quantities.

2. The product function $V_x(t) V_z(t)$ is negative or decreasing in the presence of the undesired signals $s(t)$, $n_{1s}(t)$ and $n_{2s}(t)$.

3. Since each frequency component of a function of time $f(t)$ is in quadrature with each frequency component of $\{f(t)\}_{\pi/2}$, $f(t)$ $\{f(t)\}_{\pi/2}$ is a much smaller function than $f^2(t)$.

It can be expected that destructive combination of compression noise signals $n_c(t)$ from various directions will occur. Accordingly, after the previously mentioned step of multiplying the output signal $V_x(t)$ of the horizontal geophone by the output signal $V_z(t)$ of the vertical geophone, the resulting product signal $V_x(t) V_z(t)$ may be modified and used to operate upon $V_z(t)$ to enhance seismic signal and suppress seismic noise. This results in a signal which is scaled up in amplitude in the presence of seismic signal and scaled down in amplitude in the presence of seismic noise, which signal I call the signal-enhancement-function signal.

In one technique of the present invention, the signal-enhancement-function signal is half-wave rectified and then multiplied by the original vertical geophone signal, $V_z(t)$, which has been stored by any appropriate means. This second product signal may then be bandpass filtered to attenuate undesired frequencies, which are the frequencies higher than those of seismological interest, the typical upper limit of which might be, for example, 40, 60 or 70 Hz., depending on the formation under investigation.

After the filtration step, the resulting signal is one in which seismic signals have been significantly enhanced, seismic noise has been significantly attenuated, and undesired frequencies have been removed.

Figure 4:
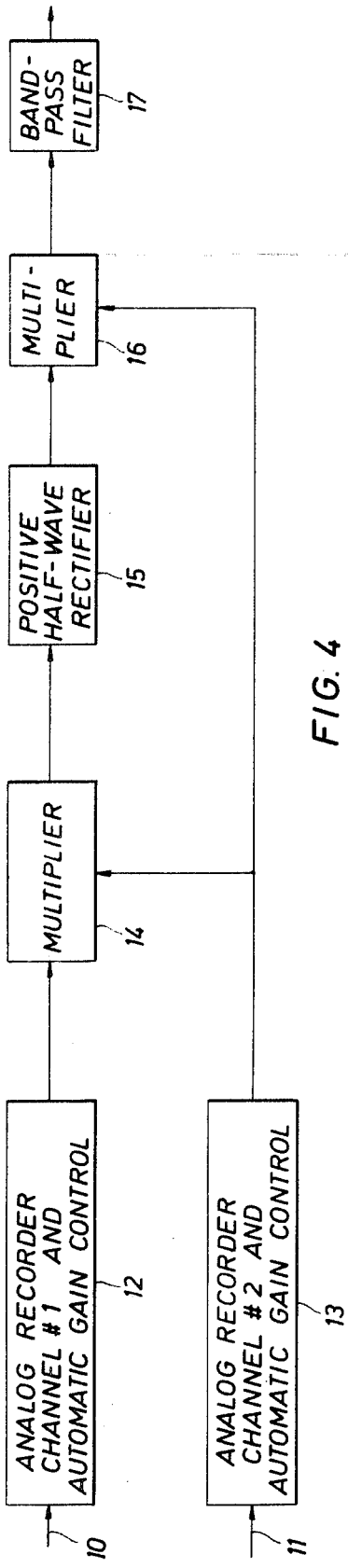
FIG. 4 is a schematic representation of one form of apparatus which may be used in carrying out the present invention.

Referring now to FIG. 4 of the drawings, it is preferred, in order to reduce the amount of portable equipment required, to record the geophone output signals $V_x(t)$ and $V_z(t)$, on separate channels, 12 and 13, of an appropriate seismic-signal recording device in which automatic gain control is employed to preserve the relative magnitudes of the horizontal and vertical signals. The remaining steps may then be carried out in a data center rather than in the field.

The data center would include a multiplier 14, into which the recorded output signals from the horizontal and vertical geophones are fed, and which forms the product $V_x(t) V_z(t)$ as its output signal. This output signal is then applied as the input to a positive half-wave rectifier 15. The output of rectifier 15 and the vertical geophone output signal, $V_z(t)$, which has been stored in recorder 13, are applied as input signals to a second multiplier 16, the output of which is applied as the input to a band-pass filter 17 to attenuate undesired frequency components, as previously mentioned. The particular construction of analog recorders 12 and 13, multipliers 14 and 16, rectifier 15 and filter 17 are well known to persons skilled in the art, and no novelty is asserted for the individual components of this analog system. The combination of these elements, however, is suggested only by the discoveries and analyses described herein.

In another technique of the present invention, the signal-enhancement-function signal, $V_x(t) V_z(t)$ is supplied to a polarity-sensing device, such as a simple switching circuit, which will produce an output signal only when the signal-enhancement-function signal is positive. This output signal may then be used to trigger a gate, the input to which is the above-mentioned output of the vertically oriented geophone. In this manner all portions of the signal $V_z(t)$ occurring when the signal-enhancement-function signal $V_x(t) V_z(t)$ is not positive are eliminated. The resulting signal, in which noise has been attenuated and signal been enhanced, may then be filtered as above to eliminate frequencies outside the range of seismological interest.

Figure 5:
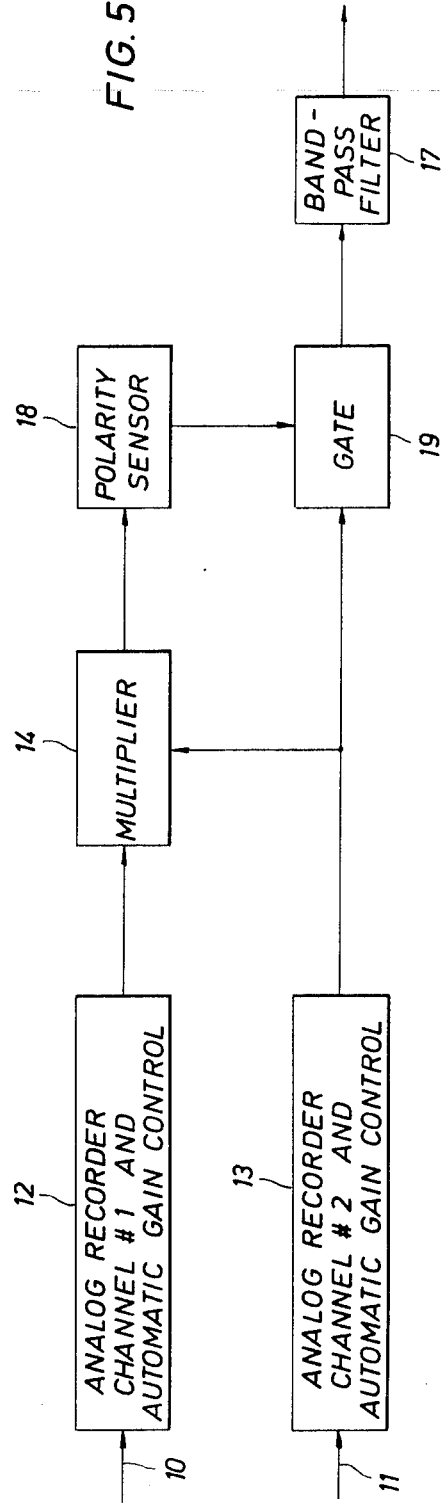
FIG. 5 is a schematic representation of another form of apparatus which may be used in carrying out the present invention.

Referring now to FIG. 5 of the drawings, apparatus for carrying out this technique is schematically shown. Components 10, 11, 12, 13 and 14 function as stated above with respect to FIG. 4. In the technique now under discussion, however, the output of multiplier 14 is applied to a polarity-sensing device 18, such as a simple electronic switch or a relay, which is set to produce an output signal only when the input signal is positive. The output signal from the polarity sensor 18 is then applied as the control signal to a suitable gate 19, the input to which is the signal from the vertically oriented geophone, $V_z(t)$, which has been stored in the second analog recorder channel 13. The gate 19 is set to produce an output signal only when the control signal from polarity sensor 18 is present. The output of the gate 19 is then applied to band-pass filter 17 to remove undesired frequency components, as above described with reference to FIG. 4. Again referring to FIG. 5, the output signals of the gate 19, and of filter 17, have an improved ratio of seismic signal to seismic noise, as compared with the output of the vertically oriented geophone 5 as shown in FIGS. 2 and 3.

It should be noted that the methods above described can be carried out with equipment other than the described thus far. For example, the recording equipment could be digital, such as the Texas Instruments' Model 10,000 Digital Field System, as opposed to analog, and the succeeding steps could be carried out on any general-purpose digital computer.

It should further be noted that, in lieu of a single horizontally oriented geophone and a single vertically oriented geophone, signals representative of the functions $V_x(t)$ and $V_z(t)$ may be produced by arrays of horizontally oriented and vertically oriented geophones, as known in the art and described in the article by C. H. Savit, J. T. Brustad and J. Sider, entitled "The Moveout Filter," in *Geophysics*, vol. XXIII, no. 1, January 1958.

It will also be seen by persons sufficiently skilled in the art, from a reading of this specification, that the signal-enhancement-function signal $V_x(t) V_z(t)$ may be employed to improve signal-to-noise ratio in ways other than those specifically described herein.

I claim:

1. A seismic data processing method comprising the steps of:
   a. Placing a first geophone in a position such that it is principally sensitive to energy received from a horizontal direction;
   b. placing a second geophone near said first geophone, such that it is principally sensitive to energy received from a vertical direction;
   c. receiving signals from the earth in said first and second geophones;
   d. recording the outputs of said first and second geophones as signals representative of first and second functions of time, respectively;
   e. multiplying said signal representative of a first function of time by said signal representative of a second function of time to produce a signal representative of a third function of time;
   f. positive half-wave rectifying said signal representative of a third function of time to produce a signal representative of a fourth function of time;
   g. multiplying said signal representative of a fourth function of time by said signal representative of a second function of time to produce a signal representative of a fifth function of time; and
   h. filtering said signal representative of a fifth function of time to remove therefrom frequency components higher than the seismological range of interest, to produce a signal representative of a sixth function of time;
   said signal representative of a sixth function of time having a higher ratio of seismic signal to seismic noise than said signal representative of a second function of time.

2. The method according to claim 1 wherein said placing steps are performed such that the sensitivity axis of said first geophone is inclined at an angle to a horizontal plane, and the sensitivity axis of said second geophone is inclined at an angle to a vertical plane, said axes being perpendicular to each other.

3. The method according to claim 1, wherein said placing of said first geophone is such that a shot point lies on the sensitivity axis of said first geophone.

4. A method of processing seismic signals in the presence of seismic noise, comprising the steps of:
   a. Generating first and second signals respectively representative of waves received from a generally horizontal direction and a generally vertical direction;

b. multiplying the first signal by the second signal to produce a third signal;

c. removing the negative components of the third signal to produce a fourth signal; and d. multiplying the fourth signal by the second signal, thereby producing a fifth signal in which the seismic signals have been enhanced and the seismic noise has been attenuated.

5. The method according to claim 4, further comprising the step of removing from the fifth signal frequency components higher than the seismological range of interest.

6. The method according to claim 5 wherein said removing step is accomplished by band-pass filtering said fifth signal.

7. The method according to claim 4, further comprising the step of recording the first and second signals before said step of multiplying said first signal by said second signal.

8. A method of processing signals representative of geophysical data, comprising the steps of:

a. Generating first and second signals respectively representative of waves received from a generally horizontal direction and a generally vertical direction;

b. multiplying the first signal by the second signal to produce a third signal;

c. removing the negative components of the third signal to produce a fourth signal; and d. multiplying the fourth signal by the second signal to produce a fifth signal, said fifth signal having a higher seismic signal to seismic noise ratio than said second signal.

9. The method according to claim 8, further comprising the step of removing from the fifth signal frequency components higher than the seismological range of interest.

10. The method according to claim 9 wherein said removing step is accomplished by band-pass filtering of said fifth signal.

11. The method according to claim 8, further comprising the step of recording the first and second signals before said step of multiplying said first signal by said second signal.

12. Apparatus for processing seismic signals in the presence of seismic noise, comprising:

a. a first geophone mounted so as to to be principally sensitive to energy received from a horizontal direction;

b. a second geophone mounted so as to be principally sensitive to energy received from a vertical direction;

c. first multiplying means, for multiplying the output signal of said first geophone by the output signal of said second geophone;

d. means for positive half-wave rectifying the output of said first multiplying means;

e. second multiplying means, for multiplying the output of said half-wave rectifying means by the output of said second geophone; and f. means for filtering undesired higher-frequency components from the output of said second multiplying means.

13. Apparatus according to claim 12, further comprising means for recording the output signals of said first and second geophones.

14. A seismic data processing method comprising the steps of:

a. Placing a first geophone in a position such that it is principally sensitive to energy received from a horizontal direction;

b. placing a second geophone near said first geophone, such that it is principally sensitive to energy received from a vertical direction;

c. receiving signals from the earth in said first and second geophones;

d. recording the outputs of said first and second geophones as signals representative of first and second functions of time, respectively;

e. multiplying said signal representative of a first function of time by said signal representative of a second function of time to produce a signal representative of a third function of time;

f. cancelling said signal representative of a second function of time during time intervals when said signal representative of a third function of time is other than positive.

15. The method according to claim 14, further comprising the step of removing, from the signal remaining after said cancelling step, frequencies higher than the seismological range of interest.

16. The method according to claim 15 wherein said removing step is accomplished by band-pass filtering said remaining signal.

17. Apparatus for processing seismic signals in the presence of seismic noise, comprising:

a. a first geophone mounted so as to be principally sensitive to energy received from a horizontal direction;

b. a second geophone mounted so as to be principally sensitive to energy received from a vertical direction;

c. means for multiplying the output signal of said first geophone by the output signal of said second geophone;

d. means for cancelling the output of said second geophone during time intervals when the output of said multiplying means is other than positive.

18. Apparatus according to claim 17, further comprising means for recording the output signals of said first and second geophones.

\* \* \* \* \*